[12] United States Patent
Cheung et al.

(10) Patent No.: US 7,623,593 B2
(45) Date of Patent: Nov. 24, 2009

(54) DATA RECEIVING APPARATUS CAPABLE OF COMPENSATING FOR REDUCED TIMING MARGIN CAUSED BY INTER-SYMBOL INTERFERENCE AND METHOD THEREOF

(75) Inventors: Tae-Sik Cheung, Daejon (KR); Dae-Ub Kim, Daejon (KR); Bheom-Soon Joo, Daejon (KR); Hae-Won Jung, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 662 days.

(21) Appl. No.: 11/181,627

(22) Filed: Jul. 13, 2005

(65) Prior Publication Data
US 2006/0156105 A1    Jul. 13, 2006

(30) Foreign Application Priority Data
Dec. 9, 2004    (KR) ............... 10-2004-0103559

(51) Int. Cl.
*H04L 25/06* (2006.01)
(52) U.S. Cl. .................................... 375/317
(58) Field of Classification Search ............... 375/317, 375/224
See application file for complete search history.

(56) References Cited
U.S. PATENT DOCUMENTS
6,212,229 B1    4/2001    Salinger
6,570,406 B2    5/2003    Tang et al.
2003/0137324 A1    7/2003    Park et al.
2005/0201491 A1*    9/2005    Wei ........................... 375/326

FOREIGN PATENT DOCUMENTS
JP    06-252702 A    9/1994
JP    10-075385 A    3/1998
KR    10-2004-0066667 A    7/2004

OTHER PUBLICATIONS
Yoshiharu Kudoh et al., A 0.13-μm CMOS 5-Gb/s 10-m 28 AWG Cable Transceiver With No-Feedback-Loop Continuous-Time Post-Equalizer, *IEEE Journal of Solid-State Circuits*, vol. 38, No. 5, May 2003).

* cited by examiner

*Primary Examiner*—Mohammad H Ghayour
*Assistant Examiner*—Tanmay K Shah
(74) *Attorney, Agent, or Firm*—Blakely, Sokoloff, Taylor & Zafman LLP

(57) ABSTRACT

Provided are a data receiving apparatus that can determine data by adjusting a reference level for determining a logic value of inputted data based on Inter-Symbol Interference in a data signal inputted through a transmission line, and receive the data without errors by compensating for timing margin decrease caused by the inter-symbol interference, and a method thereof. The apparatus includes: a reference generator for monitoring the level of an inputted data signal or generating reference levels according to an external control command; a comparator for comparing the inputted data with the reference levels and determining logic values of the inputted data; a selector for selecting the logic values of the inputted data as a valid logic value; and a selection controller for monitoring the valid logic value of the selector, transmitting a selection control signal to the selector, and controlling a process for selecting the valid logic value.

4 Claims, 7 Drawing Sheets

DATA RECEIVING APPARATUS CAPABLE OF COMPENSATING FOR REDUCED TIMING MARGIN CAUSED BY INTER-SYMBOL INTERFERENCE AND METHOD THEREOF

FIELD OF THE INVENTION

The present invention relates to a data receiving apparatus and a method thereof; and, more particularly, to a data receiving apparatus that can determine data by adjusting a reference level for determining a logic value of inputted data based on the extent of Inter-Symbol Interference (ISI) existing in a data signal inputted through a transmission line with a limited bandwidth, and receive the data without an error by compensating for a decrease in a timing margin caused by the inter-symbol interference, and a method thereof.

DESCRIPTION OF RELATED ART

Signals transmitted in the form of a square wave including both high frequency component and low frequency component, such as binary data signals generally used in most wired digital communications, are distorted as the high frequency component is attenuated more than the low frequency component while they pass through a transmission line. This causes a problem that timing margin needed for recognizing inputted data without an error is reduced on a receiving part.

Particularly, when a binary data signal is inputted after passing through a bandwidth-limited transmission line at a high rate, the time for signal rising or falling transition becomes longer than one-bit time. Thus, the inter-symbol interference phenomenon where the level of previously inputted data signals affects the currently inputted signals becomes conspicuous.

To resolve the above problem, two methods are generally used: A pre-emphasis method and an equalization method. The pre-emphasis method distorts the waveform of a data signal in advance on a transmitting part by considering the signal attenuation characteristics of a transmission line and outputs the distorted signal to thereby maintain a desired waveform when the outputted data signal arrives at a destination through the transmission line. The equalization method restores the waveform of a distorted data signal on a receiving part.

The pre-emphasis method emphasizes the amplitude of the high frequency component of a data signal relatively higher than that of the low frequency component and outputs the emphasized data signal on the transmitting part in consideration that the high frequency component of the outputted data signal is more attenuated than the low frequency component while the outputted data signal passes through a transmission line. This is revealed in U.S. Pat. No. 6,570,406 by Benjamin Tang, et al., and U.S. Pat. No. 6,212,229 by Sheldon Norman Salinger.

However, the pre-emphasis method on the transmitting part has a restriction that it requires a higher level of power than the power level for operating a logic level of an actual data signal to vary the amplitude according to a pattern of the data signal. Also, although the pre-emphasis method is applied to the transmitting part, if the frequency-based signal attenuation characteristics of the transmission line are degraded further, the data signal is inputted into the receiving part in a distorted state again. Therefore, a compensation method on the receiving part is needed.

Meanwhile, the equalization method performed on the receiving part restores the waveform of a signal by extracting a low frequency component and a high frequency component from an inputted data signal, amplifying the high frequency component relatively more than the low frequency component, and combining the two components. This is revealed in an article by Yoshiharu Kudoh in IEEE Journal of Solid-State Circuits, Vol. 38, No. 5, pp. 741-746, May 2003.

However, the conventional methods have the following problems. First, if the transmission speed of an inputted data signal is increased, the distortion of the data signal becomes more serious. Therefore, an amplifier for compensating for the distortion should be able to be operated at a high speed and provide a high gain. However, since the operation speed and gain go in an inverse proportion to each other in ordinary amplifiers, it is very difficult to design an amplifier that can satisfy the two at the same time.

Secondly, since most of the conventional equalizers on the receiving part include analog circuits, when the equalizers are formed of an integrated circuit, reproducibility is low. Also, since an analog circuit occupies wider area than a digital circuit, it can be hardly applied to multilink devices using a plurality of transmission/reception circuits.

SUMMARY OF THE INVENTION

It is, therefore, an object of the present invention to provide a data receiving apparatus that can determine data by adjusting a reference level for determining a logic value of inputted data based on the extent of Inter-Symbol Interference (ISI) existing in data signals inputted through a transmission line with a limited bandwidth, and receive the data without an error by compensating for a decrease in timing margin caused by the inter-symbol interference, and a method thereof.

It is another object of the present invention to provide a data receiving apparatus that can be realized easily and require a low production cost compared to a conventional data receiving apparatus, reduce power consumption, operate at a high speed, provide stable performance and excellent reproducibility, and require a small area due to a use of a digital circuit compared to a conventional data receiving apparatus using an analog equalizer; and a method thereof. The data receiving apparatus of the present invention secures timing margin by varying a reference level for determining a logic level of a data signal, instead of securing timing margin by amplifying a high frequency component of an inputted data signal. A conventional high-speed data receiving apparatus requires a high-speed and high-gain amplifier and requires a high level of power.

The other objects and advantages of the present invention can be understood by the following descriptions and the embodiments of the present invention. Also, it is apparent that the objects and advantages of the present invention can be realized by the means as claimed and combinations thereof.

In accordance with an aspect of the present invention, there is provided a data receiving apparatus, which includes: a reference generator for monitoring a signal level of an inputted data signal or generating a plurality of reference levels according to an external control command; a comparator for comparing the inputted data with the reference levels transmitted from the reference generator and determining a plurality of logic values of the inputted data; a selector for selecting the logic values of the inputted data transmitted from the comparator as a valid logic value upon a selection control signal; and a selection controller for monitoring the valid logic value of the selector, transmitting a selection control signal corresponding thereto to the selector, and controlling a process for selecting the valid logic value.

In accordance with another aspect of the present invention, there is provided a data receiving apparatus, which includes:

a reference generator for monitoring signal levels of data signals $D_{in+}$ and $D_{in-}$ which are inputted differentially, or generating an upward reference level adjusted higher than a virtual typical reference level and a downward reference level adjusted lower than the virtual typical reference level upon an external control command; a differential comparator for determining typical logic values of the differentially inputted data signals $D_{in+}$ and $D_{in-}$ by comparing the signal levels of the differentially inputted data signals $D_{in+}$ and $D_{in-}$ with each other, determining a first upward adjusted logic value and a second upward adjusted logic value by comparing the differentially inputted data signals $D_{in+}$ and $D_{in-}$ with the upward/downward reference levels transmitted from the reference generator, determining an upward adjusted logic value by comparing the first and second upward adjusted logic values with each other again, determining a first downward adjusted logic value and a second downward adjusted logic value by comparing the differentially inputted data signals $D_{in+}$ and $D_{in-}$ with the downward/upward reference levels from the reference generator, and determining a downward adjusted logic value of the differentially inputted data signal by comparing the first and second downward adjusted logic values; a selector for selecting any one among the typical logic value of the differentially inputted data signal transmitted from the differential comparator, the upward adjusted logic value, and the downward adjusted logic value as a valid logic value of the differentially inputted data signal upon a selection control signal; and a selection controller for providing a selection control signal to the selector in such a manner that the typical logic value of the differentially inputted data signal is selected as the valid logic value of the data signal at first, and then receiving a signal from the selector, monitoring the retimed valid logic value $D_{out}$ of the differentially inputted data signal by two bits according to a rule registered by an external control command, and providing a selection control signal to the selector in such a manner that any one among the typical logic value of the differentially inputted data signal, the upward adjusted logic value, and the downward adjusted logic value is selected as the valid logic value of a next data signal.

In accordance with another aspect of the present invention, there is provided a data receiving method, which includes the steps of: a) receiving a data signal through a transmission line; b) monitoring a signal level of the inputted data signal or generating a plurality of reference levels upon an external control command; c) determining a plurality of logic values of inputted data by comparing the inputted data signal with the above-generated reference levels, individually; d) determining whether the inputted data are initial data; e) if the inputted data are initial data, selecting and outputting a typical logic value of the inputted data signal as a valid logic value $D_{out}$ of the data signal; and f) if the inputted data are not initial data, selecting any one of the logic values of the inputted data as a next valid logic value by monitoring the previous valid logic value.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter. If it is determined that detailed description on prior art related to the present invention may blur the points of the present invention while describing the present invention, the description will not be provided herein. Hereinafter, preferred embodiments of the present invention will be described with reference to accompanying drawings.

Figure 1:
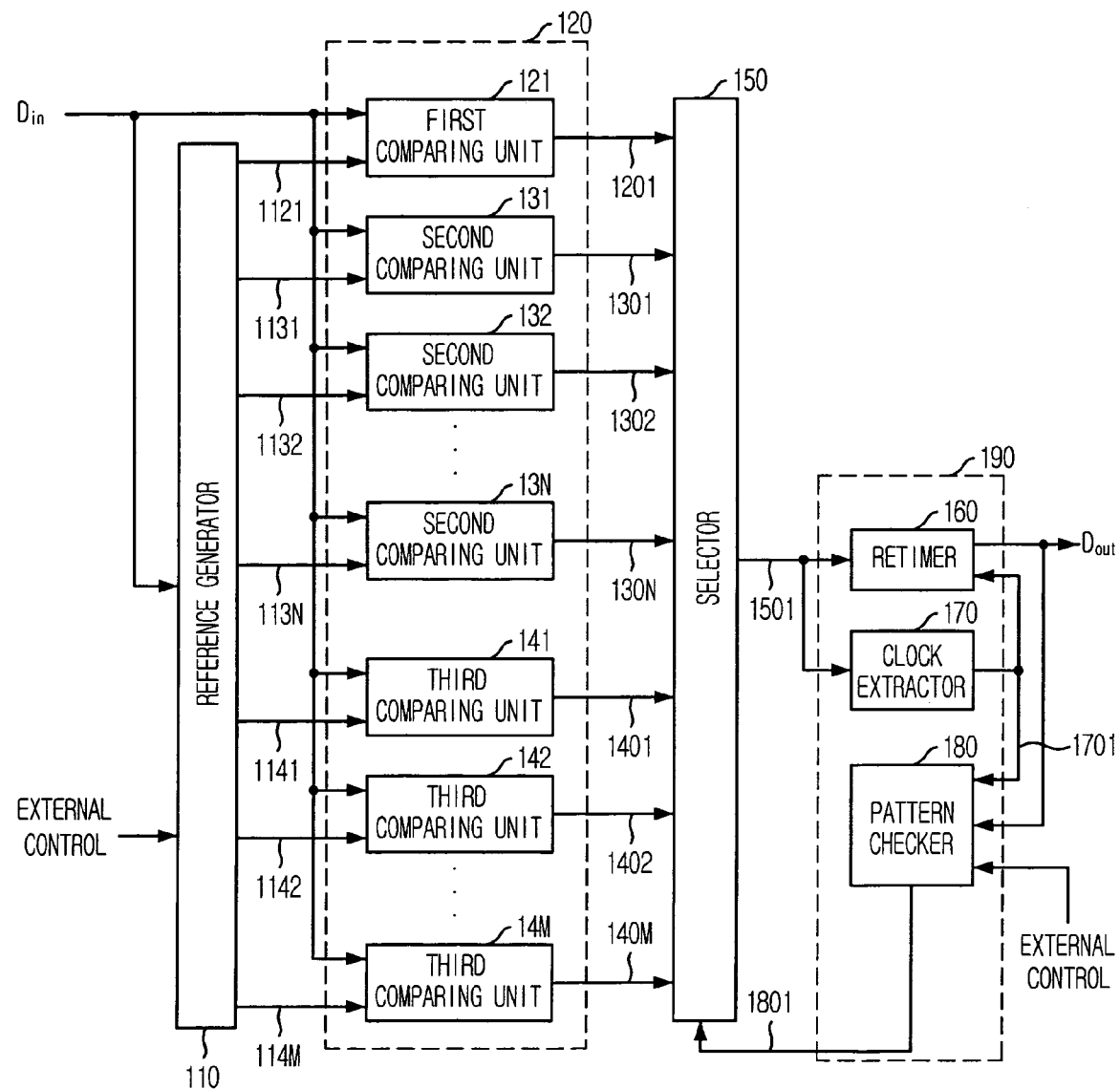
FIG. 1 is a block diagram showing a data receiving apparatus in accordance with an embodiment of the present invention.

FIG. 1 is a block diagram showing a data receiving apparatus in accordance with an embodiment of the present invention. As shown, the data receiving apparatus of the present invention includes a reference generator 110, a comparator 120, a selector 150, and a selection controller 190.

To briefly describe the constitutional elements, the reference generator 110 monitors a level of an inputted data signal or generates a plurality of reference levels for determining logic values of input data upon a control command from the outside. The comparator 120 compares the inputted data with the reference levels transmitted from the reference generator 110 and determines a plurality of logical values of inputted data. The selector 150 selects one of the logic values of the inputted data transmitted from the comparator 120 as a valid logic value. The selection controller 190 monitors the valid logic value from the selector 150, transmits a selection control signal corresponding to the valid logic value to the selector 150 to thereby control a process of valid logic value selection.

Hereafter, the structure and operation of the constitutional elements will be described more in detail. First, the reference generator 110 receives a data signal $D_{in}$ through a transmission line and monitors a signal level, or it generates a typical reference level 1121 for determining a logic value of the inputted data signal $D_{in}$, N upward reference levels 1131 to 113N (N being an integer larger than 1) which are adjusted higher than the typical reference level 1121, and M downward reference levels 1131 to 114M (M being an integer larger than 1) which are adjusted lower than the typical reference level 1121, upon a control command from the outside, and provides them to the comparator 120.

Then, the comparator 120 compares the level of the data signal $D_{in}$ with the typical reference level 1121, the N upward reference levels 1131 to 113N, and M downward reference levels 1141 to 114M, which are transmitted from the reference generator 110, determines a typical logic value 1201 of the data signal $D_{in}$, N upward logic values 1301 to 130N, and M downward logic values 1401 to 140M, and transmits them to the selector 150.

Herein, the comparator 120 includes a first comparing unit 121, N second comparing units 131 to 13N, and M third comparing units 141 to 14M. The first comparing unit 121 compares the level of the data signal $D_{in}$ with the typical reference level 1121 and determines a typical logic value 1201 of the data signal $D_{in}$. The N second comparing units 131 to 13N compare the level of the data signal $D_{in}$ with the N upward reference levels 1131 to 113N, individually, and determine N upward adjusted logic values 1301 to 130N. The M third comparing units 141 to 14M compare the level of the data signal $D_{in}$ with the M downward reference levels 1141 to 114M, individually, and determine M downward adjusted logic values 1401 to 140M.

The selector 150 selects any one among the typical logic value 1201 of the data signal $D_{in}$, the upward adjusted logic values 1301 to 130N, and the downward adjusted logic values 1401 to 140M as a valid logic value 1501 of the data signal $D_{in}$ upon a selection control signal 1801 from the selection controller 190, and transmits the valid logic value 1501 to the selection controller 190.

Then, the selection controller 190 provides a selection control signal 1801 to the selector 150 in such a manner that the typical logic value 1201 of the data signal $D_{in}$ should be selected as the valid logic value of the data signal at first, and then it receives a signal from the selector 150, monitors more than two bits of a re-timed valid logic value $D_{out}$ of the data signal $D_{in}$ according to a rule registered by a control signal from the outside, and provides a selection control signal 1801 to the selector 150 in such a manner that any one among the typical logic value 1201 of the data signal $D_{in}$, the upward adjusted logic values 1301 to 130N, and the downward adjusted logic values 1401 to 140M as a valid logic value 1501 of a next data signal.

Herein, the selection controller 190 includes a clock extractor 170, a retimer 160, and a pattern checker 180. The clock extractor 170 extracts a clock out of a signal transmitted from the selector 150 and provides the clock to the retimer 160 and the pattern checker 180. The retimer 160 performs retiming on the signal transmitted from the selector 150 and outputs a valid logic value $D_{out}$ to the outside.

The pattern checker 180 provides a selection control signal 1801 to the selector 150 in such a manner that the typical logic value 1201 of the data signal $D_{in}$ should be selected as the valid logic value of the data signal at first, and then it receives a retimed valid logic value $D_{out}$ retimed in the retimer 160, monitors, i.e., pattern-checking, more than two bits of the valid logic value $D_{out}$ according to the rule registered by a control signal from the outside, and provides a selection control signal 1801 to the selector 150 in such a manner that any one among the typical logic value 1201 of the data signal, the upward adjusted logic values 1301 to 130N, and the downward adjusted logic values 1401 to 140M as a valid logic value 1501 of a next data signal.

Hereinafter, one of the simplest embodiments where N=M=1 and the reference generator 110 and the selection controller 190 are established upon a control command from the outside will be described with reference to FIG. 2.

Figure 2:
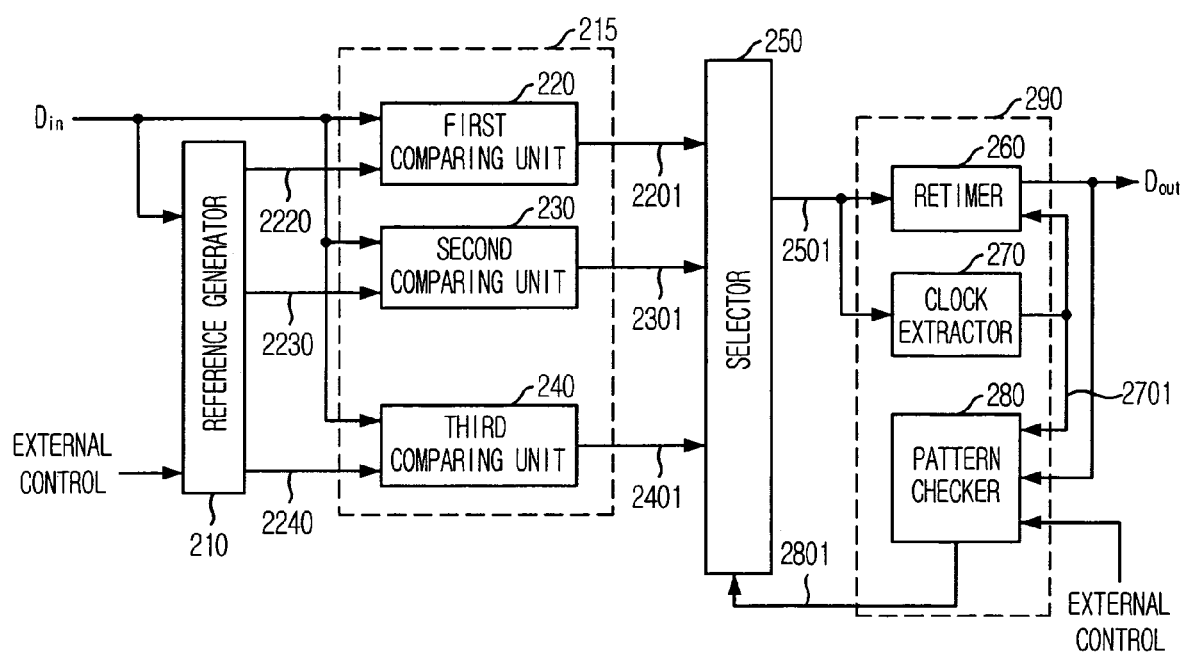
FIG. 2 is exemplary diagram illustrating a data receiving apparatus in accordance with the present invention.

FIG. 2 is exemplary diagram illustrating a data receiving apparatus in accordance with the present invention.

Since a reference generator 210, a selector 250, and a selection controller 290 presented in FIG. 2 are the same as the reference generator 110, the selector 150, and the selection controller 190 of FIG. 1 in their operation, further description on them will not be provided herein.

A comparator 215 of FIG. 2 is the same as the comparator 120 of FIG. 1 in its operation. If any, since N=M=1, there is a difference that it has only one second comparing unit 230 and one third comparing unit 240 as well as one first comparing unit 220.

In short, the comparator 215 includes a first comparing unit 220, a second comparing unit 230, and a third comparing unit 240. The first comparing unit 220 compares the level of a data signal $D_{in}$ with a typical reference level 2220 and determines a typical logic value 2201 of the data signal $D_{in}$. The second comparing unit 230 compares the level of the data signal $D_{in}$ with an upward reference level 2230 and determines an upward adjusted logic value 2301 of the data signal $D_{in}$. The third comparing unit 240 compares the level of the data signal $D_{in}$ with a downward reference level 2240 and determines a downward logic value 2401 of the data signal $D_{in}$.

Herein, the reference generator 210 is formed of elements that can be controlled by an external control command. For example, when a 1.5V high-speed TTL logic (HSTL) is used as a signal level of the data signal $D_{in}$, the typical reference level 2220 is established to be 0.5×1.5V=0.75V, while the upward reference level 2230 and the downward reference level 2240 are controlled to be adjusted up and down by 10% upon a control signal from the outside and established to be 0.825V and 0.675V, respectively.

Also, the first to third comparing units 220 and 240 can be fabricated in the form of a differential amplifier or a differential buffer which is strong to common-mode noise, and the selector 250 can be formed of a simple MUX circuit. The selection controller can be formed of a plurality of flip-flop logic circuits.

Therefore, the data receiving apparatus of the present invention, which is described in FIG. 2, can be formed of circuits that can be easily fabricated technically.

Figure 3:
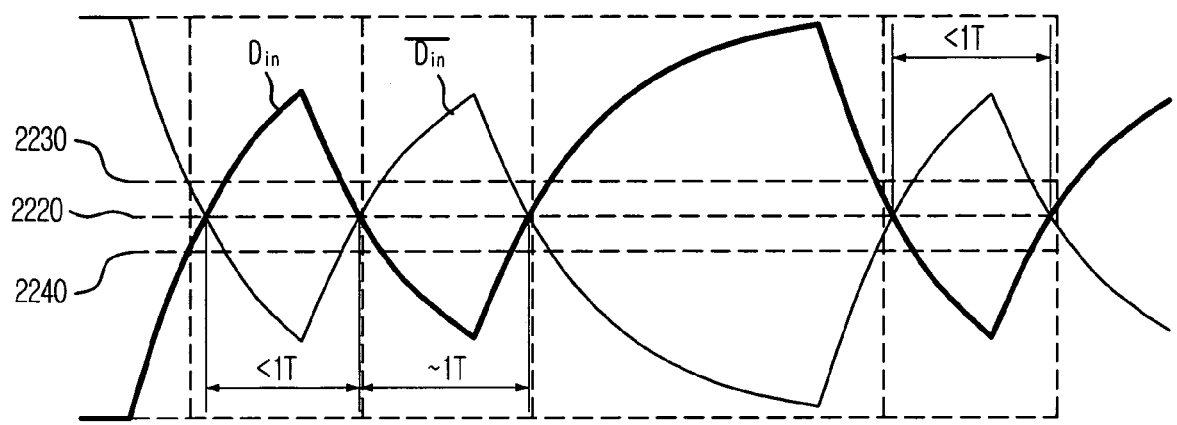
FIG. 3 is a timing diagram describing distortion of a data signal waveform caused by inter-symbol interference.

FIG. 3 is a timing diagram showing distortion of a data signal waveform caused by inter-symbol interference.

As illustrated in FIG. 3, since a high-speed data signal inputted through a transmission line with a limited bandwidth has a longer signal rising/falling transition time than one-bit data time, i.e., a period of a bit clock, the level of a current data signal is varied according to a logic value of previous data.

In short, when the data signal repeats a logic value '0' and a logic value '1' and the average level of the data signal approaches to the typical reference level 2220, it is possible to secure timing margin as much as one-bit time when the logic value of the data signal $D_{in}$ is determined based on the typical reference level 2220. However, when a data signal having a logic value '0' and a logic value '1' is inputted consistently and a data signal having a logic value '0' and a logic value '1' is inputted while the average level of the data signal is lower or higher than the typical reference level 2220, the timing margin for determining the logic value of the data signal $D_{in}$ based on the typical reference level 2220 is shorter than one-bit time. This problem becomes prominent when the frequency-based signal attenuation characteristics are degraded seriously or when the transmission rate of the data signal is increased.

Figure 4A:
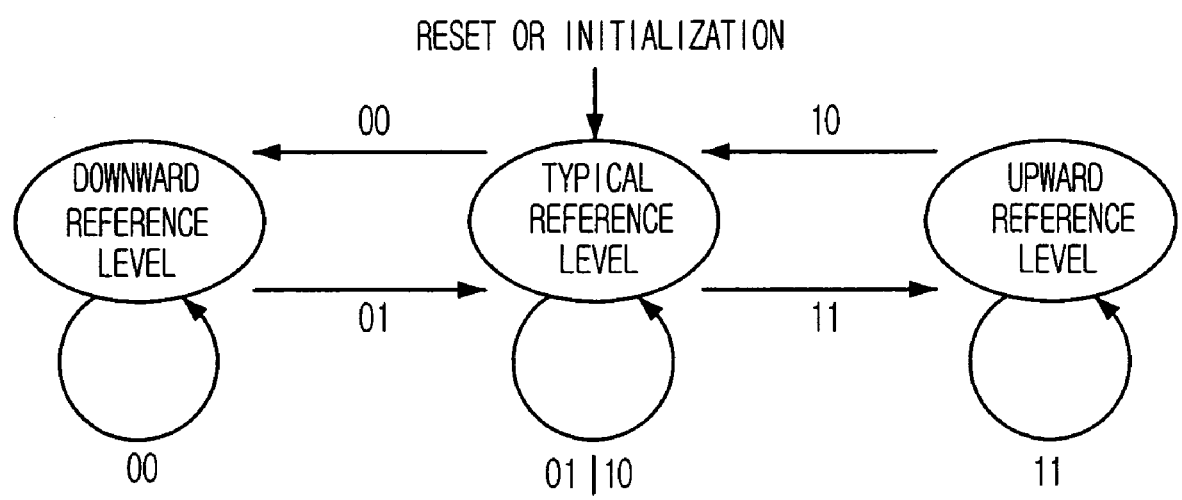
FIGS. 4A and 4B are diagrams describing operation rules of a pattern checker shown in FIG. 2.

The problems with the varying signal level caused by the inter-symbol interference of the inputted data signal and decreased timing margin can be resolved by forming the selection controller 290 to provide a selection control signal 2801 according to the rule presented in FIG. 4A.

Figure 4B:
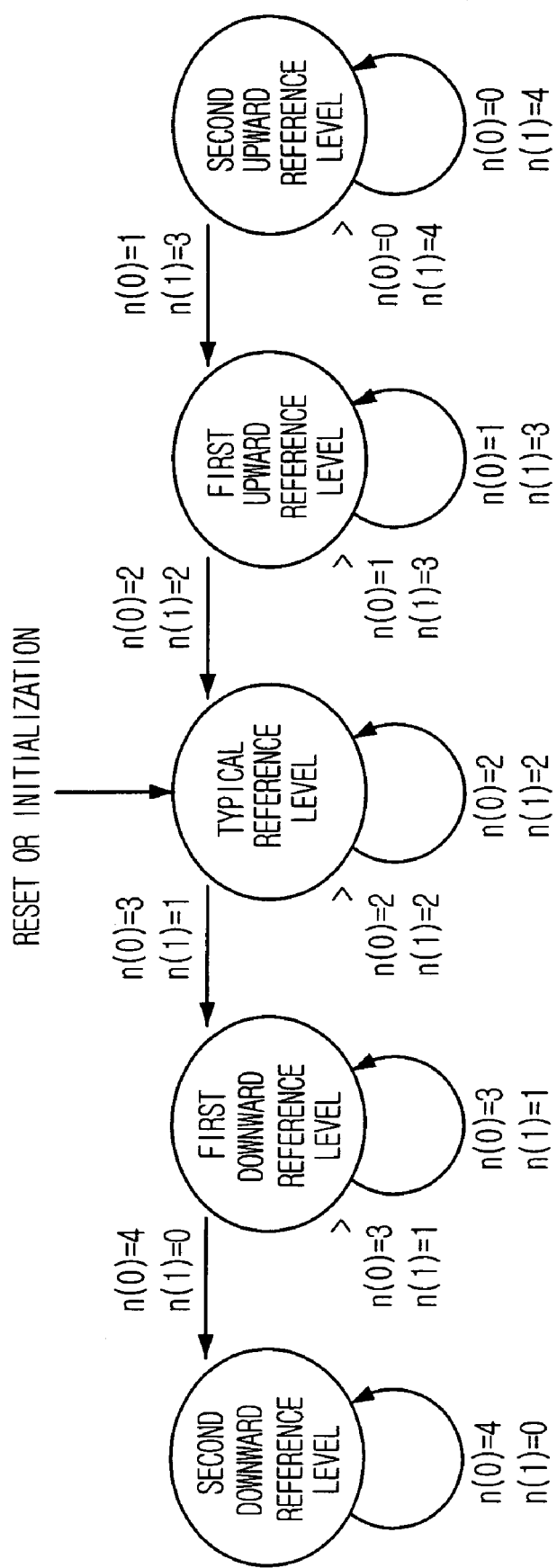

FIGS. 4A and 4B are diagrams describing operation rules of a pattern checker shown in FIG. 2. As shown, the operation rule of the selection controller 290 of the present invention is an embodiment of the simplest rule for controlling the reference level by monitoring two bits of inputted data. If a signal rising/falling transition occurs and the monitored two bits of inputted data become 01 or 10 so that the average value of the data signal approaches to the typical reference level 2220, the logic level determined based on the typical reference level 2220 is selected as a valid data logic value of the next data signal.

If the monitored two bits of the inputted data are 00 or 11, the average value of the data signal is ascended or descended higher or lower than the typical reference level 2220 because the rising/falling transition does not occur at least for the two bits. Thus, the logic value of a data signal determined based on the downward reference level 2240 or upward reference level 2230 is selected as a valid data logic value of the next data signal. This way, the optimal timing margin can be secured all the time.

To control the reference level more delicately than the rule presented in FIG. 4A, more than two bits of inputted data can be monitored and reference levels can be adjusted according to each case. Operation rule of this case is presented in FIG. 4B in accordance with an embodiment of the present invention. As described above, the operation rule of the selection controller 290 can be established diversely according to the number of bits to be monitored, combinations of monitored bitstreams and mapping information on the reference levels corresponding thereto, which is transmitted from the outside.

Figure 5:
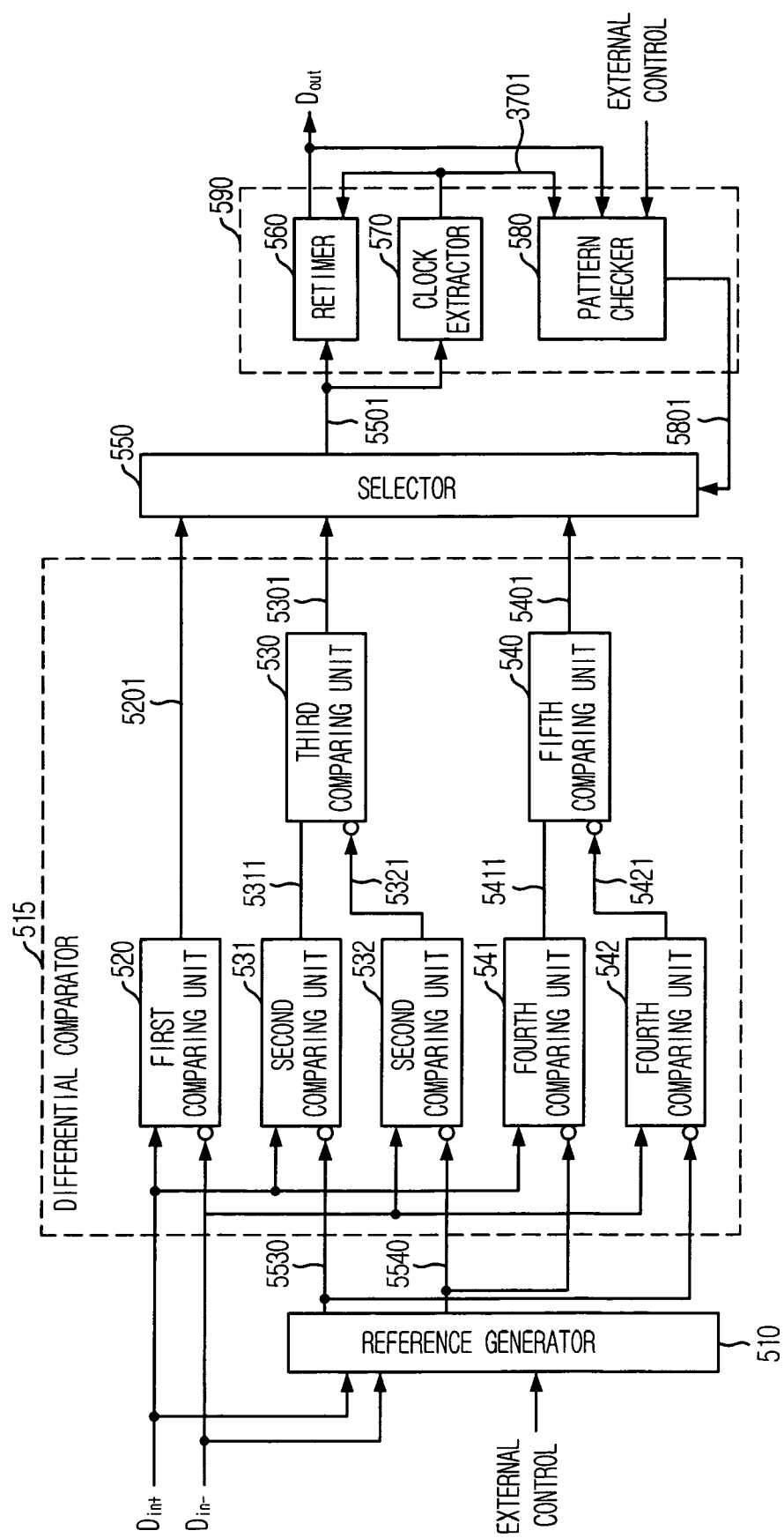
FIG. 5 is a block diagram illustrating a data receiving apparatus operated in a differential logic level in accordance with another embodiment of the present invention.

FIG. 5 is a block diagram illustrating a data receiving apparatus operated in a differential logic level in accordance with another embodiment of the present invention.

First, a reference generator 510 monitors signal levels of data signals $D_{in+}$ and $D_{in-}$ which are inputted differentially, or it generates an upward reference level 5530 adjusted higher than a virtual typical reference level for determining a logic value of the data signal $D_{in+/-}$ upon a control signal from the outside or a downward reference level 5540 adjusted lower than the virtual typical reference level, and transmits them to a differential comparator 515.

The differential comparator 515 compares the signal levels of the data signals $D_{in+}$ and $D_{in-}$ and determines a typical logic value 5201 of the data signal $D_{in+/-}$. Then, it determines a first upward adjusted logic value 5311 and a second upward adjusted logic value 5321 by comparing the data signals $D_{in+}$ and $D_{in-}$ with the upward/downward reference levels 5530 and 5540. Subsequently, it compares the first and second upward adjusted logic value 5311 and 5321 again to thereby determine an upward adjusted logic value 5301 of the data signal $D_{in+/-}$. Then, the differential comparator 515 compares the data signals $D_{in+}$ and $D_{in-}$ with the downward/upward reference levels 5540 and 5530 from the reference generator 510 and determines a first downward adjusted logic value 5411 and a second downward adjusted logic value 5421. It compares the first and second downward adjusted logic values 5411 and 5421 again to thereby determine a downward adjusted logic value 5401 of the data signal $D_{in+/-}$ and transmits the downward adjusted logic value 5401 to a selector 550.

Herein, the differential comparator 515 includes a first comparing unit 520, two second comparing units 531 and 532, a third comparing unit 530, two fourth comparing units 541 and 542, and a fifth comparing unit 540. The first comparing unit 520 compares the signal levels of data signals $D_{in+}$ and $D_{in-}$ with each other and determines a typical logic value 5201 of the data signal $D_{in+/-}$. The second comparing units 531 and 532 compare the signal level of the data signal $D_{in+}$ with the upward reference level 5530 from the reference generator 510, compare the signal level of the data signal $D_{in-}$ with the downward reference level 5540 from the reference generator 510, and determine a first upward adjusted logic value 5311 and a second upward adjusted logic value 5321.

The third comparing unit 530 compares the first upward adjusted logic value 5311 and the second upward adjusted logic value 5321, which are transmitted from the two second comparing units 531 and 532, with each other and determines an upward adjusted logic value of the data signal $D_{in+/-}$. The fourth comparing units 541 and 542 compare the data signal $D_{in+}$ with the downward reference level 5540 from the reference generator 510, compare the data signal $D_{in-}$ with the upward reference level 5530 from the reference generator 510, and determine a first downward adjusted logic value 5411 and a second downward adjusted logic value 5421. The fifth comparing unit 540 compares the first downward adjusted logic value 5411 and the second downward adjusted logic value 5421, which are transmitted from the two fourth comparing units 541 and 542, with each other and determines a downward adjusted logic value 5401 of the data signal $D_{in+/-}$.

The selector 550 selects any one among the typical logic value 5201 of the data signal $D_{in}$ transmitted from the differential comparator 515, the upward adjusted logic value 5301, and the downward adjusted logic value 5401 as a valid logic value 5501 of the data signal $D_{in+/-}$ upon a selection control signal 5801 from the selection controller 590, and transmits the valid logic value 5501 to the selection controller 590.

Then, the selection controller 590 provides the selection control signal 5801 to the selector 550 in such a manner that the typical logic value 5201 of the data signal $D_{in+/-}$ should be selected as the valid logic value 5501 of the data signal at first, and then it receives a signal from the selector 550, monitors the retimed valid logic value $D_{out}$ of the data signal $D_{in+/-}$ by two bits according to a rule registered by an external control command, and provides a selection control signal 5801 to the selector 550 in such a manner that any one among the typical logic value 5201 of the data signal $D_{in+/-}$, the upward adjusted logic value 5301, and the downward adjusted logic value 5401 should be selected as the valid logic value 5501 of the next data signal. Herein, since the selection controller 590 is realized the same as the above-described selection controller 190 of FIG. 1, further description on it will not be provided.

The typical logic value 5201 of the data signal $D_{in+/-}$ is obtained from one differential comparator 520, and the upward adjusted logic value 5301 of the data signal $D_{in+/-}$ is obtained by determining the upward adjusted reference levels of the data signals $D_{in+}$ and $D_{in-}$ by using the two second comparing units 531 and 532 and then comparing the upward adjusted reference levels again with each other by using the third comparing unit 530. This is because, in case of a data signal $D_{in+}$, the upward reference level 5530 serves as the upward reference level and, in case of a data signal $D_{in-}$, the downward reference level 5540 serves as the upward reference level. The downward adjusted logic value 5401 of the data signal $D_{in+/-}$ can be obtained in the same manner. The operation principle and structure of the other constitutional elements are the same as described above.

Figure 6:
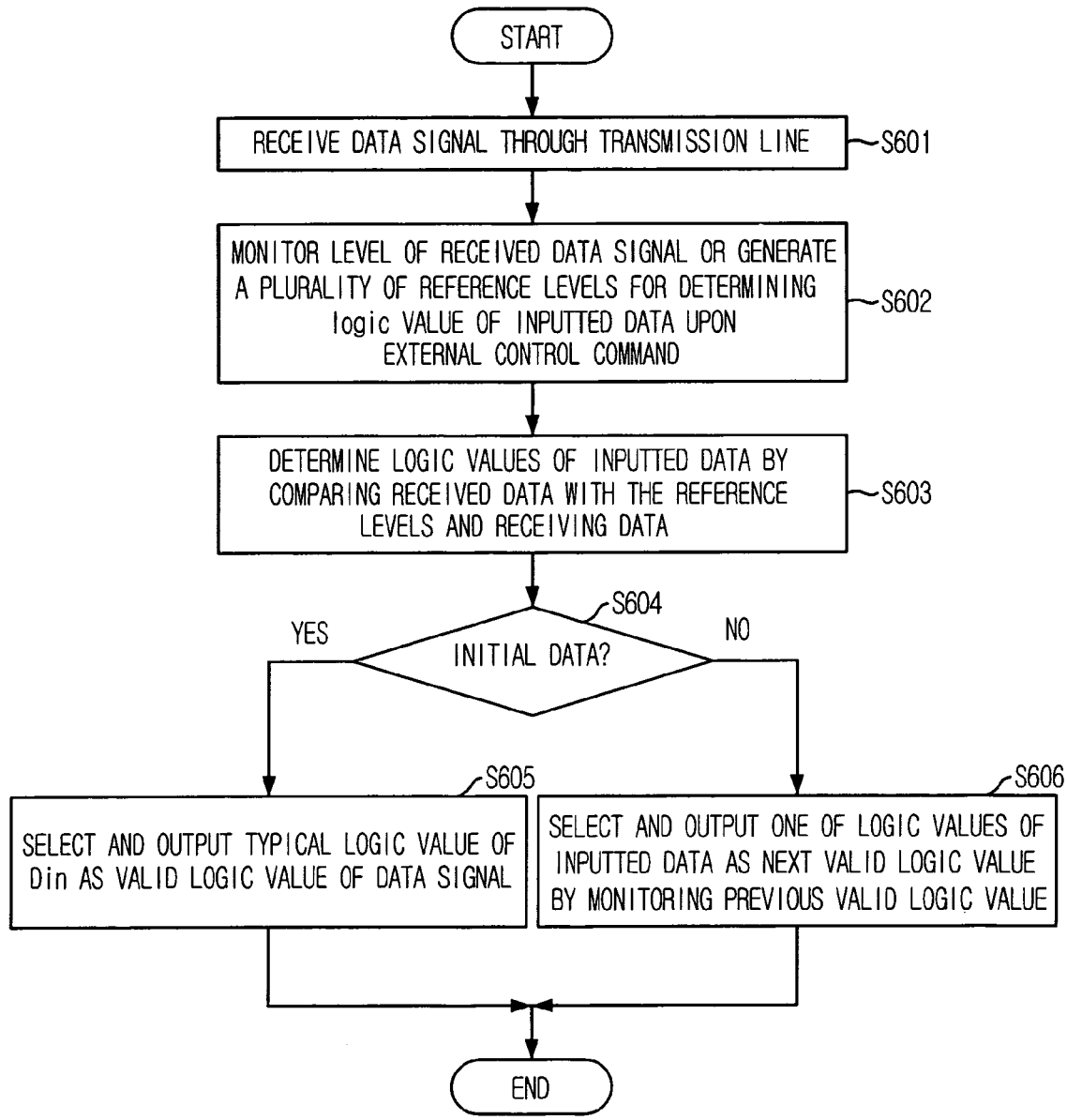
FIG. 6 is a flowchart describing a data receiving method in accordance with an embodiment of the present invention.

FIG. 6 is a flowchart describing a data receiving method in accordance with an embodiment of the present invention.

First, at step S601, if a data signal transmitted through a transmission line is inputted, at step S602, the level of the inputted data signal is monitored or a plurality of reference levels are generated to determine a logic value of the inputted data upon a control command from the outside. In other words, the level of the inputted data signal is monitored; or a typical reference level, N upward reference levels adjusted to be higher than the typical reference level, and M downward reference levels adjusted to be lower than the typical reference level are generated to for determining a logic value of the data signal $D_{in}$ upon an external control command.

At step S603, logic values of the inputted data are determined by comparing the inputted data signal with the above-generated reference levels. In short, the typical logic value of the data signal $D_{in}$, N upward adjusted logic values, and M downward adjusted logic values are determined at the step S603 by comparing the signal level of the data signal $D_{in}$ with the above-generated typical reference level, M upward reference levels, and the M downward reference levels.

At step S604, it is determined whether they are initial data or not.

If they are the initial data, at step S605, the typical reference level of the data signal is selected as a valid logic value $D_{out}$ of the data signal and outputted. Then, the logic flow goes back to the step S601.

Meanwhile, if it is determined at the step S604 that they are not initial data, that is, if they are data that come after the initial data, at step S606, the previous valid logic value is monitored and any one among the logic values of the inputted data is selected as the next valid logic value and outputted. Then, the logic flow goes back to the step S601. In short, the retimed valid logic value $D_{out}$ of the previous data signal $D_{in}$ is monitored by more than two bits according to a rule registered by an external control signal, and any one among the typical logic value of the inputted data signal, the upward adjusted logic value, and the downward adjusted logic value is selected as a valid logic value $D_{out}$ of the next input data signal and outputted.

As described above, the data receiving apparatus of the present invention can compensate for reduction in timing margin caused by inter-symbol interference and receive data without errors by adjusting a reference level for determining a logic value of inputted data according to inter-symbol interference existing in a data signal inputted through a transmission line with a limited band and thereby determining the data.

Also, the data receiving apparatus of the present invention can be easily fabricated at a low cost, operated at a high-speed, and reduce power consumption, compared to a conventional data receiving apparatus, which requires a high-speed and high-gain amplifier and requires high power consumption, by varying a reference level for determining a logic level of a data signal to secure timing margin, instead of amplifying a high frequency component of an inputted data signal to secure timing margin.

In addition, since the data receiving apparatus of the present invention is formed of a digital circuit, other than a conventional analog equalizer, it can provide stable performance and excellent reproducibility and requires small area.

The present application contains subject matter related to Korean patent application No. 2004-0103559, filed in the Korean Intellectual Property Office on Dec. 9, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A data receiving apparatus, comprising:
a reference generating means for generating a plurality of reference levels by monitoring a signal level of an inputted data signal or according to an external control command, wherein the reference levels include a typical reference level, a plurality of upward reference levels adjusted higher than the typical reference level, and a plurality of downward reference levels adjusted lower than the typical reference level;
a comparing means for comparing the inputted data signal with the reference levels transmitted from the reference generating means and determining a plurality of logic values of the inputted data signal;
a selecting means for selecting the logic values of the inputted data signal transmitted from the comparing means as a valid logic value upon a selection control signal; and
a selection controlling means for monitoring the valid logic value of the selecting means, transmitting the selection control signal corresponding thereto to the selecting means, and controlling a process for selecting the valid logic value,
wherein the comparing means includes:
a first comparing unit for determining a typical logic value of the inputted data signal $D_{in}$ by comparing a signal level of the inputted data signal Din with the typical reference level;
a plurality of second comparing units for determining a plurality, of upward adjusted logic values by comparing the signal level of the inputted data signal Din with the upward reference levels, individually; and
a plurality of third comparing units for determining a plurality of downward adjusted logic values by comparing the signal level of the inputted data signal Din, with the downward reference levels, individually,
wherein the selecting means selects any one among the typical logic value of the inputted data signal Din, the upward adjusted logic values, and the downward adjusted logic values, which are transmitted from the comparing means, as the valid logic value of the inputted data signal Din upon the selection control signal from the selection controlling means, and transmits the valid logic value to the selection controlling means,
wherein the selection controlling means provides the selection control signal to the selecting means in such a manner that the typical logic value of the inputted data signal Din is selected as the valid logic value of the inputted data signal at first, and then receives a signal from the selecting means, monitors more than two bits of a re-timed valid logic value Dour of the inputted data signal Din according to a rule registered by an external control signal, and provides the selection control signal to the selecting means in such a manner that any one among the typical logic value of the inputted data signal $D_{in}$, the upward adjusted logic values, and the downward adjusted logic values as a valid logic value of a next data signal.

2. The apparatus as recited in claim 1, wherein the selection controlling means includes:
a clock extractor for extracting a clock out of a signal transmitted from the selecting means and providing the clock to a retimer and a pattern checker;
the retimer for retiming the signal transmitted from the selecting means and outputting the valid logic value $D_{out}$ to the outside; and
a pattern checker for providing the selection control signal to the selecting means in such a manner that a typical logic value of the inputted data signal $D_{in}$ is selected as the valid logic value of the inputted data signal at first, receiving a retimed valid logic value re-timed in the retimer, monitoring, that is, pattern-checking, more than two bits of the valid logic value $D_{out}$ according to a rule registered by an external control signal, and providing the selection control signal to the selecting means in such a manner that any one among the typical logic value of the inputted data signal, upward adjusted logic values, and downward adjusted logic values as a valid logic value of a next data signal.

3. A data receiving apparatus, comprising:
a reference generating means for generating an upward reference level adjusted higher than a virtual typical reference level and a downward reference level adjusted lower than the virtual typical reference level by monitoring signal levels of data signals $D_{in+}$ and $D_{in-}$ which are inputted differentially or base on an external control command;

a differential comparing means for determining typical logic values of the differentially inputted data signals $D_{in+}$ and $D_{in-}$ by comparing the signal levels of the differentially inputted data signals $D_{in+}$ and $D_{in-}$ with each other, determining an upward adjusted logic value by comparing the first and second upward adjusted logic values with each other after determining a first upward adjusted logic value and a second upward adjusted logic value by comparing the differentially inputted data signals $D_{in+}$ and $D_{in-}$, with the upward/downward reference levels transmitted from the reference generating means, and determining a downward adjusted logic value of the differentially inputted data signal by comparing the first and second downward adjusted logic values after determining a first downward adjusted logic value and a second downward adjusted logic value by comparing the differentially inputted data signals $D_{in+}$ and $D_{in-}$ with the downward/upward reference levels from the reference generating means;

a selecting means for selecting any one among the typical logic value of the differentially inputted data signal, the upward adjusted logic value, and the downward adjusted logic value as a valid logic value of the differentially inputted data signal upon a selection control signal; and a selection controlling means for providing the selection control signal to the selecting means in such a manner that the typical logic value of the differentially inputted data signal is selected as the valid logic value of the data signal at first, and then receiving a signal from the selecting means, monitoring the retimed valid logic value of the differentially inputted data signal by two bits according to a rule registered by the external control command, and providing the selection control signal to the selecting means in such a manner that any one among the typical logic value of the differentially inputted data signal, the upward adjusted logic value, and the downward adjusted logic value is selected as a valid logic value of a next data signal, wherein the differential comparing means includes:

a first comparing unit for determining the typical logic value of the differentially inputted data signal by comparing the signal levels of differentially inputted data signals $D_{in+}$ and $D_{in-}$ with each other;

two second comparing units for determining a first upward adjusted logic value and a second upward adjusted logic value by comparing the positive differentially inputted data signal $D_{in+}$ with the upward reference level from the reference generating means and comparing the negative differentially inputted data signal $D_{in}$ with the downward reference level from the reference generating means;

a third comparing unit for determining an upward adjusted logic value of the differentially inputted data signal by comparing the first upward adjusted logic value with the second upward adjusted logic value, which are transmitted from the two second comparing units;

two fourth comparing units for determining a first downward adjusted logic value and a second downward adjusted logic value by comparing the positive differentially inputted data signal $D_{in+}$ with the downward reference level from the reference generating means and comparing the negative differentially inputted data signal $D_{in}$ with the upward reference level from the reference generating means; and a fifth comparing unit for determining a downward adjusted logic value of the differentially inputted data signal by comparing the first downward adjusted logic value with the second downward adjusted logic value, which are transmitted from the two fourth comparing units.

4. A data receiving method, comprising the steps of:

a) receiving a data signal inputted through a transmission line;

b) generating a plurality of reference levels by monitoring a signal level of the inputted data signal or upon an external control command, wherein the reference levels include a typical reference level, a plurality of upward reference levels adjusted higher than the typical reference level, and a plurality of downward reference levels adjusted lower than the typical reference level;

c) determining a plurality of logic values of inputted data signal by comparing the inputted data signal with the above-generated reference levels, individually;

d) determining whether the inputted data signal is initial data;

e) if the inputted data signal is initial data, selecting and outputting a typical logic value of the inputted data signal as a valid logic value $D_{out}$; and f) if the inputted data signal is not initial data, selecting any one of the logic values of the inputted data signal as a next valid logic value by monitoring the previous valid logic value, wherein the step c) includes:

determining the typical logic value of the inputted data signal $D_{in}$ by comparing the signal level of the inputted data signal $D_{in}$ with the typical reference level;

determining a plurality of upward adjusted logic values by comparing the signal level of the inputted data signal $D_{in}$ with the upward reference levels, individually; and determining a plurality of downward adjusted logic values by comparing the signal level of the inputted data signal $D_{in}$ with the downward reference levels, individually, wherein, in the step b), the typical reference level, the upward reference levels, and the downward reference levels are generated by monitoring the signal level of the inputted data signal or upon the external control command, wherein, in the step c), the signal level of the inputted data signal is compared with the typical reference level, the upward reference levels and the downward reference levels, and the typical logic value of the inputted data signal, a plurality of upward adjusted logic values, and a plurality of downward adjusted logic values are determined, and wherein, in the step f), any one among the typical logic value of the inputted data signal, the upward adjusted logic values, and the downward adjusted logic values is selected as the valid logic value $D_{out}$ of a next inputted data signal and outputted by monitoring more than two bits of a retimed valid logic value of the previously inputted data signal based on a rule registered by the external control command.

* * * * *